United States Patent
Yu et al.

(10) Patent No.: US 6,636,645 B1
(45) Date of Patent: Oct. 21, 2003

(54) IMAGE PROCESSING METHOD FOR REDUCING NOISE AND BLOCKING ARTIFACT IN A DIGITAL IMAGE

(75) Inventors: Qing Yu, Rochester, NY (US); Jiebo Luo, Rochester, NY (US); Rajan L. Joshi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 639 days.

(21) Appl. No.: 09/606,700

(22) Filed: Jun. 29, 2000

(51) Int. Cl.[7] .................................. G06K 9/00
(52) U.S. Cl. ................. 382/268; 358/426.01; 358/3; 375/240.29; 382/162; 382/260; 382/165; 382/261
(58) Field of Search ................ 382/268, 199, 382/200, 275, 164, 166, 167, 260, 261, 266, 264, 232, 239, 254, 242, 250; 358/426.01, 426.16, 518–525; 375/240.29; 348/625

(56) References Cited

U.S. PATENT DOCUMENTS

| | | | | |
|---|---|---|---|---|
| 5,452,104 A | * | 9/1995 | Lee | 358/426.14 |
| 5,856,848 A | * | 1/1999 | Fujiwara et al. | 375/240.13 |
| 5,966,465 A | * | 10/1999 | Keith et al. | 382/232 |
| 6,040,876 A | * | 3/2000 | Pettitt et al. | 348/624 |
| 6,151,420 A | * | 11/2000 | Wober et al. | 382/275 |
| 6,226,410 B1 | * | 5/2001 | O'Rourke | 382/232 |
| 6,434,275 B1 | * | 8/2002 | Fukuda et al. | 382/275 |
| 6,463,182 B1 | * | 10/2002 | Onishi et al. | 382/261 |
| 6,510,242 B1 | * | 1/2003 | Westerman | 382/162 |
| 2001/0002214 A1 | * | 5/2001 | Yeo et al. | 382/167 |
| 2001/0022857 A1 | * | 9/2001 | Kondo et al. | 382/268 |
| 2001/0031097 A1 | * | 10/2001 | Mancuso et al. | 382/264 |
| 2002/0196355 A1 | * | 12/2002 | Hiroshige et al. | 348/252 |
| 2003/0020835 A1 | * | 1/2003 | Petrescu | 348/625 |

OTHER PUBLICATIONS

U.S. patent application Ser. No. 09/415,374, Adams, Jr. et al., filed Oct. 8, 1999.
U.S. patent application Ser. No. 09/522,742, Gindele et al., filed Mar. 10, 2000.
"Reduction of Blocking Effect in Image Coding" by Howard C. Reeve III and Jae S. Lim. ICASSP, pp. 1212–1215, 1983.
"Artifact Reduction in Low Bit Rate DCT–Based Image Compresion" by Jiebo Luo, Chang Wen Chen, Kevin J. Parker, and Thomas S. Huang.

* cited by examiner

*Primary Examiner*—Bhavesh M. Mehta
*Assistant Examiner*—Barry Choobin
(74) *Attorney, Agent, or Firm*—David M. Woods

(57) ABSTRACT

A digital image processing method reduces noise and blocking artifacts in a digital image by first converting the RGB values of the digital image pixels to Y, Cb and Cr components, then detecting the block boundaries in the Y, Cb and Cr image components, and estimating the noise in the Y, Cb and Cr image components. One or more noise tables are constructed for the Y, Cb and Cr image components. An adaptive Huber-Markov-random-field-model-based filter (HMRF) is applied to the Y, Cb and Cr image components, wherein the adaptive feature of the HMRF employs the detected block boundaries and the noise tables to produce filtered Y, Cb and Cr image components. Finally, the filtered Y, Cb and Cr image components are converted to RGB components.

19 Claims, 2 Drawing Sheets

IMAGE PROCESSING METHOD FOR REDUCING NOISE AND BLOCKING ARTIFACT IN A DIGITAL IMAGE

FIELD OF THE INVENTION

This invention relates to the field of digital image processing, and more particularly to methods for reducing noise and blocking artifacts in a digital image.

BACKGROUND OF THE INVENTION

Digital images are widely used in image communication. Due to the various components in the image communication chain, along with various image processing methods applied to the digital images, these digital images may contain certain artifacts, such as imaging noise and JPEG blocking artifacts (if the image is highly compressed in a JPEG format). Thus, effective image enhancement techniques are required to process these digital images in order to achieve better image quality.

A typical approach known in the prior art for such image enhancement may comprise a series of sequential steps, such as the following:

1. noise reduction for a luminance channel through image filtering (e.g., as described in commonly assigned U.S. patent application Ser. No. 09/522,742, entitled "Noise reduction method utilizing statistical weighting, apparatus, and program for digital image processing", filed Mar. 10, 2000 in the names of E. B. Gindele and J. Luo);
2. noise reduction for a chrominance channel through image filtering (e.g., as described in commonly assigned U.S. patent application Ser. No. 09/415,374, entitled "Removing chroma noise from digital images by variable shape pixel neighborhood regions" filed Oct. 8, 1999 in the names of J. E. Adams, Jr. and J. F. Hamilton, Jr.); and
3. JPEG de-blocking through image filtering (e.g., as described in H. C. Reeve III and J. S. Lim, "Reduction of blocking effect in image coding," *ICASSP*, pp. 1212–1215, 1983).

The main drawbacks of such sequential processing are the following:

1. output images are soft with severe loss of details due to consecutive filtering operations (i.e., smoothing in nature); and
2. execution speed is slow, and thus may not be suitable for time-critical applications.

In J. Luo et al, "Artifact Reduction in Low Bit Rate DCT-based Image Compression", *IEEE Transaction on Image Processing*, vol. 5, No. 9, September, 1996, Luo et al teaches a method for artifact reduction for JPEG compressed images by using a Huber-Markov random-field model-based filtering technique, which differentiates artifacts (e.g., noise and JPEG block boundaries) from image details and applies filtering that treats block boundaries and non-block boundaries differently.

This method for artifact reduction taught by Luo et al is based on a number of assumptions, such as:

1. image noise is not intensity dependent;
2. JPEG block boundary locations are known in advance; and
3. the input signal is a gray scale digital image.

These assumptions, however, may not hold for certain image applications. For example, images from most digital cameras are color images that have three channels (R, G, B). Moreover, for most digital cameras, noise level is highly intensity dependent. In addition, there will be no prior knowledge as to where the block boundaries are located if a cropping operation has been performed on the JPEG compressed images.

Therefore, it is highly desirable to develop an efficient algorithm that adaptively removes noise and JPEG blocking artifacts at the same time. Thus there is a need for an improved, efficient method for processing an image in order to reduce noise and blocking artifacts.

SUMMARY OF THE INVENTION

The present invention is directed to overcoming one or more of the problems set forth above. Briefly summarized, according to one aspect of the present invention, a digital image processing method reduces noise and blocking artifacts in a digital image having pixels representing RGB values by converting the digital image pixels to X1, X2 and X3 components; detecting the block boundaries in the X1, X2 and X3 image components; estimating the noise in the X1, X2 and X3 image components; constructing one or more noise tables for the X1, X2 and X3 image components; applying an adaptive Huber-Markov random-field model-based filter (HMRF) to the X1, X2 and X3 image components, where the HMRF employing the detected block boundaries and the noise tables to produce filtered X1, X2 and X3 image components; and converting the filtered X1, X2 and X3 image components to RGB components.

ADVANTAGES

The present invention has the advantage that the amount of noise reduction applied is adapted to the local intensity and noise statistics of the digital image, resulting in a consistent-appearing image. The present invention also has the advantage that it does not require prior knowledge as to where the JPEG block boundaries are located.

DETAILED DESCRIPTION OF THE INVENTION

In the following description, a preferred embodiment of the present invention will be described as an image processing method that would ordinarily be embodied as a software program. Those skilled in the art will readily recognize that the equivalent of such software may also be constructed in hardware. Because image manipulation algorithms and systems for running such algorithms are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown, described or suggested herein may be selected from such systems, algorithms, components and elements known in the art. Given the method as described according to the invention in the following materials, software not specifically shown or described herein that is useful for implementation of the invention is conventional and within the ordinary skill in such arts.

Furthermore, as used herein, the computer program may be stored in a computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
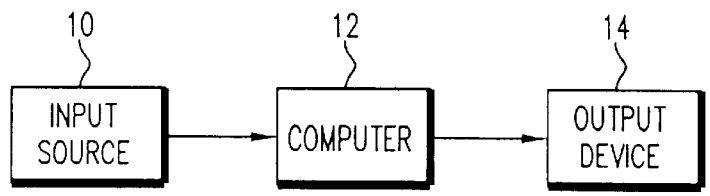
FIG. 1 is a block diagram showing an image processing system suitable for practicing the image processing method according to the present invention.

The present invention relates to a method for reducing noise and blocking artifacts in a digital image. Referring to FIG. 1, a typical image processing system suitable for practicing the present invention is illustrated. An input digital image comes from an input source 10, e.g., a digital camera or scanner, an Internet connection, a separate storage device, or the like. A computer 12 then processes the input digital image according to the present invention to generate an output image, which will be sent to an output device 14, e.g., a digital printer, a display device, an Internet connection, a separate storage device, or the like.

Figure 3:
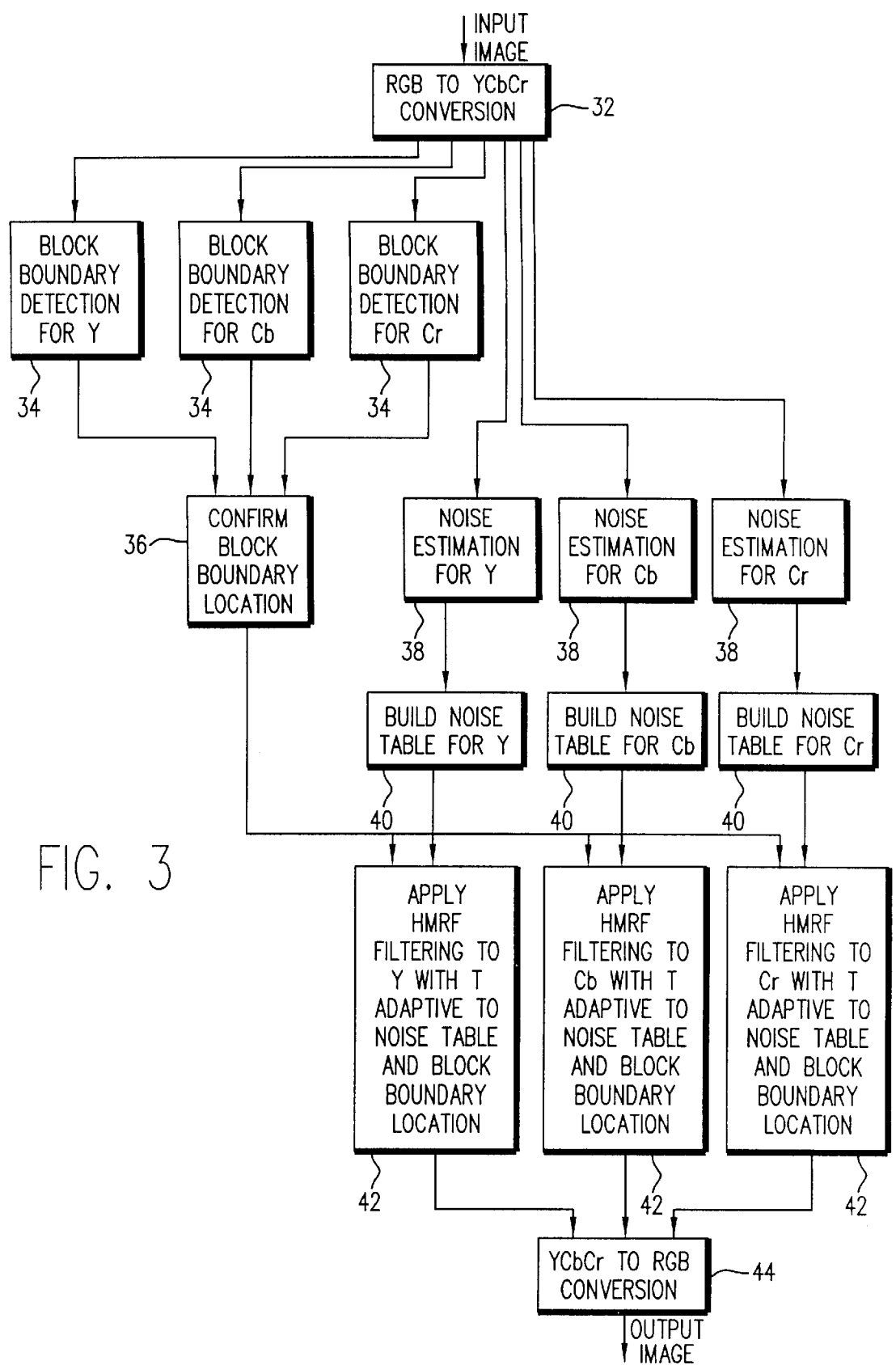
FIG. 3 is a flow chart showing one embodiment of the image processing method according to the present invention.

FIG. 3 shows a flow chart of the current embodiment of the image processing method according to the present invention, which will be described in greater detail below. A digital image having pixels representing RGB values is first converted in step 32 into three image components X1, X2 and X3, which for purposes of the preferred embodiment are Y, Cb and Cr image components. For color images, a color transform is typically performed before image compression to take advantage of the redundancy in the color perception of the human visual system. For example, in JPEG compression, a color image is first converted from RGB to YCbCr color space with the following equations:

$$Y=16+65.481*R+128.553*G+24.966*B;$$

$$Cb=128-37.797*R-74.203*G+112*B;$$

$$Cr=128+112*R-93.786*G-18.214*B;$$

where Y is the intensity component, and Cb and Cr are the two chrominance components. R, G and B are all normalized to 1. A block boundary detection step 34 is then carried out for the Y, Cb and Cr components, respectively, and the block boundary estimates are further compared in step 36 with each other to confirm the block boundary location. A noise estimation step 38 is also carried out for the Y, Cb and Cr components, respectively, from which three noise tables are generated in a step 40. In the next step 42, an adaptive HMRF filter is applied to the Y, Cb and Cr components respectively to produce filtered Y, Cb and Cr image components. A filter parameter T (related to the potential function of the HMRF filter) is adaptive to the corresponding noise table and block boundary location. In general, at block boundaries, the filter parameter T is an inverse function of the compression ratio of the input digital image, elsewhere, the filter parameter T is a function of the noise as represented by the noise table. In the current embodiment, the filter parameter T equals the noise estimate. Finally, the filtered Y, Cb and Cr image components are converted in a step 44 back to RGB components.

As generally shown in FIG. 3, the image processing method of the present invention includes three modules, as outlined below:

1. a noise estimation module;
2. a JPEG block boundary detection module; and
3. an image smoothing module with an adaptive Huber-Markov random-field model-based (HMRF) filter.

The noise estimation module, the JPEG block boundary detection module and the image smoothing module with the adaptive HMRF filter will now be separately described in further detail.

Noise Estimation

Noise estimation is carried out for the individual components of the digital image independently. Two noise estimators are used: a mean estimator and a median estimator. While these two estimators are used in the preferred embodiment to generate noise tables, a skilled person would be aware of many other existing noise estimators may also be employed to generate noise tables.

The first estimator, the mean estimator, calculates the mean of a local window where the current pixel is centered, and reports the absolute difference between the mean value and the current pixel value as one noise estimation for the current pixel. To keep image edges from contributing to the estimate, the noise contribution is discarded if the magnitude of the intensity gradient of the current pixel is larger than a predetermined threshold value A. Sobel operators are used as the intensity gradient operators to generate an intensity gradient image with the intensity gradient equal to the sum of the absolute values from the horizontal and vertical Sobel operators. In the current embodiment of the invention, the standard deviation (SD) of the intensity gradient image is calculated, and the threshold value A is set as twice SD.

The second estimator, the median estimator, calculates the median of a local window where the current pixel is centered, and reports the absolute different between the median value and the current pixel value as another noise estimation for the current pixel.

The smaller value from the two noise estimators is then selected as the final noise estimation for the current pixel.

For each image component of the input digital image, the intensity range is divided into N intervals, and the noise estimates for pixels within the same interval are averaged to produce a noise estimate for that intensity interval. To keep image edges from contributing to the estimate, the noise contribution is discarded if the magnitude of the intensity gradient of a pixel is larger than the predetermined threshold value A. This follows the same procedure as defined in connection with the mean estimator. In the current embodiment, for an 8-bit input digital image, the intensity range of each image component is uniformly divided into 16 intervals (0–15, 16–31, . . . , 240–255). A 2-column noise table is generated when noise estimation is completed for one image component. The first column represents intensity intervals and the second column represents the noise estimation for the intensity intervals. When the input image has multiple image components, multiple noise tables are generated correspondingly.

JPEG Block Boundary Detection

JPEG block boundary detection is also performed on each image component independently. For each image component, a column difference image is first generated by calculating the absolute difference between two adjacent columns of the input image. For example, this process involves subtracting the pixel values of the second column of the image from the pixel values of the first column of the image to generate a column of difference values, and then to set the pixel values of the first column of the column difference image equal to the absolute values of the column of difference values. The same procedure is repeated to set the rest of the columns of the column difference image, except for the last column where all the values of that column are set to zero.

The column difference image is further averaged in the vertical direction to generate a one-dimensional column difference array VA. Assuming that the original image has M rows and N columns of image data, the column difference array VA should have N entries. To keep image edges from contributing to the detection, the contribution of a pixel in the column difference image is discarded if the magnitude of the intensity gradient of the corresponding pixel in the original image component is larger than the threshold value A. This follows the same procedure as defined in the noise estimation procedure.

The column difference array VA is further averaged using a periodicity of the JPEG block width (e.g., 8 pixels) to generate a block averaged column difference array VAA, which has eight entries. In other words, every eighth entry of the column difference array VA will be averaged, and the result will be used to set the eight entries of the block averaged column difference array VAA.

Finally, we look for the maximum value of the block averaged column difference array VAA and the corresponding array index of the maximum value will be the final JPEG block boundary location in the horizontal direction for the image component. For example, if the index for the maximum value in the block averaged column difference array VAA is 4, then it is assumed that JPEG block boundary will appear at column 4, 12, . . . in the original image component. Note that the indexes for the columns of the image component as well as for the block averaged column difference array VAA start at zero in this embodiment.

The location of the block boundary in the vertical direction is also estimated analogously to the block boundary location in the horizontal direction.

The JPEG block boundary estimation is carried out for all the image channels. The estimates are further compared with each other. If they agree with each other, then the estimates will be used in the subsequent filtering process; otherwise, it is assumed that there is probably not too many block artifacts in the original image, and thus no special action should be taken to reduce the blocking artifact.

Image Smoothing With an Adaptive HMRF Filter

At low bit rates, the reconstructed images suffer from loss of image details and sharpness, and coding artifacts, due to the loss of a considerable amount of information in the quantization. While in general the information loss may be impractical to recover, some coding artifacts can be alleviated through the incorporation of image smoothness constraints using an appropriate image prior model.

On the other hand, the constraints from the transform coding can be utilized to prevent further image degradation, such as over-smoothing of remaining image details. The enhancement of the reconstructed images from transform coding can be formulated as an image restoration problem once we know the degradation process that the image has gone through. By constructing an image restoration problem, one tries to restore the image in terms of signal fidelity, instead of mere enhancement in terms of perception. Therefore, both subjective criterion and objective criterion are used to evaluate the restoration results. For a reference on using image restoration to remove JPEG blocking artifacts, see the aforementioned Luo et al article.

In the interest of computational efficiency, we choose to perform image enhancement instead of image restoration in the preferred embodiment of this invention. The noise estimate and the block boundary location estimate are utilized to help set parameters for detail preserving image enhancement.

Figure 2:
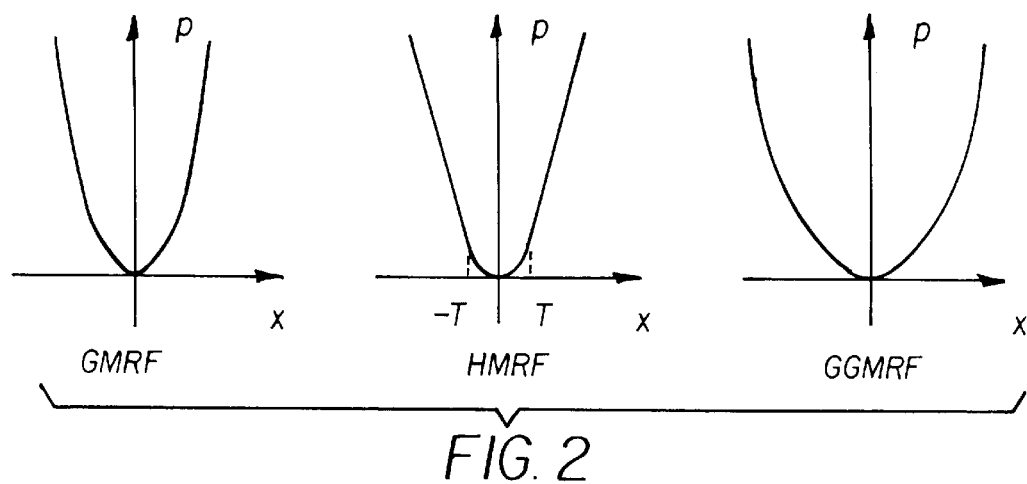
FIG. 2 is a plot are plots showing convex potential functions that have been used in the prior art to enforce an image smoothness constraint.

There are several convex potential functions that have been used to enforce image smoothness constraint. These functions are shown in FIG. 2. Convex functions are often desired because the convergence of a convex constrained problem is always guaranteed if solutions do exist, and it can also be optimized efficiently due to fast convergence. More importantly, with the variable being the difference between neighboring pixels, convex potential functions with smooth transition, i.e., with good continuity properties, result in desired continuity in the image.

Gauss-Markov random field (GMRF) has been widely used because of its analytical advantages. However, the linear low-pass filtering nature of a GMRF tends to blur image edges and other details excessively and indiscriminately. This is because the quadratic term in the exponent of a Gaussian function grows too quickly with the increase of the difference between pixel values and therefore imposes an excessive penalty to edges. The Generalized Gauss-Markov random field (GGMRF) model proposed has been shown to be able to achieve good compromise between noise suppression and detail preservation because this model essentially imposes nonlinear filtering. The parameter p is generalized from 2, which corresponds to GMRF, to a real number between 1.0 and 2.0. In the restoration of compressed images, we use a specific Gibbs random field called the Huber-Markov random field (HMRF). Its potential function $V_{c,T}(x)$ is in the form of Equation 1. This function has been successfully applied to image enhancement in the removal of the blocking effect in DCT-based coding. It can be written as:

$$V_{c,T}(x) = \begin{cases} x^2, & |x| \leq T \\ T^2 + 2T(|x| - T), & |x| > T \end{cases} \quad (1)$$

where T is a threshold. If we define the gray level differences between the current pixel $x_{m,n}$ and the pixels within its neighborhood $N_{m,n}$ as:

$$\{x_{m,n} - x_{k,l}\}_{k,l \in N_{m,n}};$$

then, these differences can substitute for the variable of the Huber minimax function. The nice properties of the Huber minimax function is its ability to smooth certain types of artifacts while still preserving the image detail, such as edges and regions of textures. The quadratic segment of the function imposes least mean square smoothing of the artifacts when the local variation is below the threshold T. On the other hand, the linear segment of the function enables the preservation of image details by allowing large discontinuities in the image with a much lighter penalty.

A major advantage of the HMRF model over other types of GRF models for image restoration is its ability to switch the penalty on discontinuities according to the difference of gray level between current pixel and its neighbors. In terms of implementation, the HMRF model makes the computation much more efficient because only linear operations are involved in the optimization where gradients are usually utilized. This is another reason why the HMRF model is chosen over GGMRF models.

Block-based Discrete Cosine Transform has been the most popular transform in a variety of image and video compression applications. In low bit rate applications, a high compression ratio is desired and is usually achieved by coarse quantization and truncation of the high frequency coefficients that are considered visually less significant. Consequently, two major artifacts known as the "blocking effect" and the "ringing effect" are generated and they severely degrade the quality of the decompressed image. The "blocking effect" is the major artifact that appears as perceptible rectangular block structures in the reconstructed image. Many filtering techniques dealing with this problem essentially apply linear filtering to the decompressed blocky image so that they also smooth out the original image details. Linear filtering is especially undesired at low bit rates when the remaining image details need to be well preserved. The ringing effect appears as ringing patterns around sharp edges in the reconstructed image. In order not to blur the image while removing the ringing effect, an edge-preserving nonlinear filtering is desired.

The switching capability of the HMRF model is very important in distinguishing discontinuities of different nature. However, this switching property is still inadequate when we need to distinguish image details from the artifacts. Without semantics, a single value of the threshold T cannot accurately describe all the discontinuities, and is not sufficient to differentiate true image edges from artifacts. Fortunately, the mechanism of image degradation that generates the artifacts, and the locations of these artifacts, are known or can be estimated in DCT-based coding. We can use such information to develop a variation of the HMRF model for this particular application. The discontinuities inside each image block are produced in a different way from those along the block boundary regions. Inside the block, the discontinuities come from the quantization and the truncation of high frequency coefficients. Along the block boundaries, further discontinuities are introduced because no correlation is established across the boundaries. The artificial block boundaries can be considered as extra high frequency energy at specific known locations and require additional smoothing. Therefore, these two kinds of discontinuities should be treated differently. A larger value of the threshold T(T1) is chosen in the HMRF model for those pixels in the block boundary regions in order to smooth the artifacts, while a moderate value of the threshold T(T2) is applied to the inner block regions.

We take advantage of noise estimation and the estimated block boundary location to serve the purpose of preserving more image details and removing more artifacts. In general, the blocking artifact concentrates around block boundaries created by JPEG. Therefore, a larger threshold T is used to boost artifact removal around estimated block boundaries. For pixels away from block boundaries, a smaller threshold T is used to apply a lesser degree of artifact removal, and thereby achieve noise removal.

Because of the convexity of the Huber minimax function, image enhancement can be performed efficiently by using a gradient descent optimization technique in an iterative fashion. In particular, in a local neighborhood, the gradient of the Huber function is computed and used in conjunction with a step size to perform detail-preserving smoothing. The step size, multiplied by the gradient of the Huber function, determines the amount of change in the pixel value. This local gradient descent process is repeated for all the local neighborhood regions of the image in one iteration. We use a "cooling-down" strategy by decreasing the step size by half after each iteration.

Since the image is smoothened only under the constraints of the HMRF model, the result can be sensitive to the choice of the threshold T. In general, a small threshold T may be insufficient in reducing severe noise at certain intensities, while an unnecessarily large threshold T would over-smooth the image. A good choice of the threshold T provides the best compromise between artifact smoothing and detail preservation. We use the noise estimate to select proper threshold T values for different intensity levels. In general, the threshold T should be proportional to the noise estimate. In the current embodiment, the threshold T for a specific intensity level is set as the noise estimate for the intensity range the intensity level belongs to.

The invention has been described with reference to a preferred embodiment. However, it will be appreciated that variations and modifications can be effected by a person of ordinary skill in the art without departing from the scope of the invention.

| PARTS LIST |
| --- |
| 10 input source |
| 12 computer |
| 14 output device |
| 32 RGB to YCbCr conversion |
| 34 block boundary detection |
| 36 block boundary confirmation |
| 38 noise estimation |
| 40 noise table builder |
| 42 adaptive HMRF filtering |
| 44 YCbCr to RGB conversion |

What is claimed is:

1. A digital image processing method for reducing noise and blocking artifacts in a digital image having pixels representing RGB values, comprising the steps of:
    a) converting the digital image pixels to X1, X2 and X3 image components;
    b) detecting the block boundaries in the X1, X2 and X3 image components;
    c) estimating the noise in the X1, X2 and X3 image components;
    d) constructing one or more noise tables for the X1, X2 and X3 image components;
    e) applying an adaptive smoothing filter to the X1, X2 and X3 image components, wherein the adaptive smoothing filter employs the detected block boundaries and the noise tables to produce filtered X1, X2 and X3 image components; and
    f) converting the filtered X1, X2 and X3 image components to RGB components.

2. The method as claimed in claim 1, wherein the X1, X2 and X3 image components are Y, Cb and Cr components, respectively.

3. The method as claimed in claim 1, wherein the adaptive smoothing filter is a Huber-Markov random-field model-based filter (HMRF).

4. The method as claimed in claim 1, wherein the step of estimating the noise is performed by:
    a) employing a first noise estimator the calculates the mean value of a local window and takes the absolute value of the difference between the mean value and a current pixel value;
    b) employing a second noise estimator that calculates the median value of a local window and takes the absolute value of the difference between the median value and a current pixel value; and
    c) choosing the smallest value calculated in steps a) and b) as the final noise estimation.

5. The method as claimed in claim 4, wherein the step of constructing one or more noise tables comprises the steps of:
    a) dividing the intensity range for each image component into N intervals; and
    b) averaging the noise estimations for pixels in each interval to produce a noise estimate for that interval.

6. The method as claimed in claim 5, wherein N=16.

7. The method as claimed in claim 5, further comprising the step of, for intervals having no entries, interpolating a noise estimate from noise estimates in neighboring intervals.

8. The method as claimed in claim 4, further comprising the steps of:
   a) generating an intensity gradient image;
   b) calculating the standard deviation of the gradient image;
   c) setting a threshold value that is twice the standard deviation; and
   d) in the first noise estimator, excluding the pixels in the local window whose gradient is larger than the threshold value.

9. The method as claimed in claim 5, further comprising the steps of:
   a) generating an intensity gradient image;
   b) calculating the standard deviation of the gradient image;
   c) setting a threshold value that is twice the standard deviation; and
   d) excluding the noise estimations from pixels whose gradient is larger than the threshold value.

10. The method as claimed in claim 1, wherein the block boundaries are detected by:
    a) forming a column difference image;
    b) averaging the values in the columns in the column difference image to produce a column difference array;
    c) computing the average of the values in the difference array that are separated by one block width to produce a block averaged column difference array;
    d) determining the location of the maximum value in the block averaged column difference array and employing the location as an offset to locate a horizontal block boundary in the image; and
    e) repeating steps a)–d) of this claim in the row direction to locate a vertical block boundary in the image.

11. The method as claimed in claim 10, further comprising the step of:
    a) generating an intensity gradient image;
    b) calculating the standard deviation of the gradient image;
    c) setting a threshold value the is twice the standard deviation; and
    d) excluding pixels, when averaging the values in the columns and rows, whose gradient is larger than the threshold value.

12. The method as claimed in claim 3, wherein the HMRF filter includes an adaptive threshold T that is determined by the steps of:
    a) at block boundaries, the threshold T is an inverse function of the compression ratio of the image; and
    b) elsewhere, the threshold T is a function of the noise as represented by the noise table.

13. The method as claimed in claim 12, wherein elsewhere the threshold T equals the noise estimate.

14. A computer program product for reducing noise and blocking artifacts in a digital image having pixels represented by a plurality of image components comprising: a computer readable storage medium having a computer program stored thereon for performing the steps of:
    a) detecting the block boundaries in the image components;
    b) estimating the noise in the image components;
    c) constructing one or more noise tables for the image components; and
    d) applying an adaptive Huber-Markov random-field model-based filter (HMRF) to the image components, wherein the HMRF filter employs the detected block boundaries and the noise tables to produce filtered image components.

15. The computer program product as claimed in claim 14 wherein the plurality of image components are Y, Cb and Cr components, respectively.

16. The computer program product as claimed in claim 14 wherein the digital image includes pixels representing RGB values that are converted to the plurality of image components, further comprising the step of converting the filtered image components to RGB components.

17. The computer program product as claimed in claim 14, wherein the step of estimating the noise is performed by:
    a) employing a first noise estimator based on the difference between a mean value and a current pixel value;
    b) employing a second noise estimator based on the difference between a median value and the current pixel value; and
    c) choosing the smallest value calculated in steps a) and b) as the final noise estimation.

18. The computer program product as claimed in claim 14, wherein the step of detecting the block boundaries comprises the steps of:
    a) forming a column difference image;
    b) averaging the values in the columns in the column difference image to produce a column difference array;
    c) computing the average of the values in the difference array at block intervals to produce a block averaged column difference array;
    d) determining the location of the maximum value in the block averaged column difference array and employing the location to locate a horizontal block boundary in the image; and
    e) repeating steps a)–d) in this claim in the row direction to locate a vertical block boundary in the image.

19. The computer program product as claimed in claim 14, wherein the HTMF filter includes an adaptive threshold T that is determined by the steps of:
    a) at block boundaries, the threshold T is an inverse function of the compression ratio of the image; and
    b) elsewhere, the threshold T is a function of the noise as represented by the noise table.

* * * * *